(12) United States Patent
Bell et al.

(10) Patent No.: US 7,619,585 B2
(45) Date of Patent: Nov. 17, 2009

(54) DEPTH FUSED DISPLAY

(75) Inventors: Gareth Paul Bell, Auckland (NZ);
Gabriel Damon Engel, Hamilton (NZ);
Mark John Searle, Cambridge (NZ)

(73) Assignee: Puredepth Limited, Auckland (NZ)

( * ) Notice: Subject to any disclaimer, the term of this patent is extended or adjusted under 35 U.S.C. 154(b) by 329 days.

(21) Appl. No.: 10/841,133

(22) Filed: May 7, 2004

(65) Prior Publication Data

US 2005/0206582 A1    Sep. 22, 2005

Related U.S. Application Data

(63) Continuation of application No. PCT/NZ02/00243, filed on Nov. 11, 2002.

(30) Foreign Application Priority Data

Nov. 9, 2001    (NZ) .................................... 515395

(51) Int. Cl.
G09G 5/00 (2006.01)
H04N 13/04 (2006.01)
G02F 1/13 (2006.01)

(52) U.S. Cl. ................ 345/9; 345/1.3; 345/4; 348/51; 348/52; 348/53; 349/73

(58) Field of Classification Search ............... 345/1.3, 345/2.2, 3.1, 6–9, 87, 82, 102, 419–422, 345/426; 348/51–53; 340/716; 349/15, 349/64, 70; 359/53, 98, 738; 362/561, 611–615
See application file for complete search history.

(56) References Cited

U.S. PATENT DOCUMENTS

| 3,863,246 A | 1/1975 | Trcka et al. |
|---|---|---|
| 3,967,881 A | 7/1976 | Moriyama et al. |
| 4,294,516 A | 10/1981 | Brooks |
| 4,333,715 A | 6/1982 | Brooks |
| 4,364,039 A | 12/1982 | Penz |
| 4,371,870 A | 2/1983 | Biferno |
| 4,472,737 A | 9/1984 | Iwasaki |
| 4,523,848 A | 6/1985 | Gorman et al. |
| 4,568,928 A | 2/1986 | Biferno |
| 4,649,425 A | 3/1987 | Pund |

(Continued)

FOREIGN PATENT DOCUMENTS

AU    82482/98    9/1998

(Continued)

OTHER PUBLICATIONS

Courter et al., Microsoft Office 2000 Professional Edition, 1999, Sybex Inc., pp. xxxi, 543, 685.

(Continued)

*Primary Examiner*—Henry N Tran

(57) ABSTRACT

A method of displaying an image with variable perceived depth using a display (1) including one or more at least partially transparent, substantially parallel imaging screens (3) located in front of, and overlapping with, a rear imaging screen (4), characterized in that a physical image is formed on two or more imaging screens (3,4), each image being of substantially identical configuration and being sized and aligned such that like portions of each image are coterminous to a viewer observing the display, wherein at least two of said coterminous images are displayed with different luminance.

45 Claims, 6 Drawing Sheets

U.S. PATENT DOCUMENTS

| | | | |
|---|---|---|---|
| 4,757,626 A | 7/1988 | Weinreich | |
| 4,768,300 A | 9/1988 | Rutili | |
| 5,112,121 A | 5/1992 | Chang et al. | |
| 5,113,272 A | 5/1992 | Reamey | |
| 5,124,803 A | 6/1992 | Troxel | |
| 5,198,936 A | 3/1993 | Stringfellow | |
| 5,300,942 A | 4/1994 | Dolgoff | |
| 5,302,946 A | 4/1994 | Shapiro et al. | |
| 5,361,165 A | 11/1994 | Stringfellow et al. | |
| 5,367,801 A | 11/1994 | Ahn | |
| 5,369,450 A | 11/1994 | Haseltine et al. | |
| 5,473,344 A | 12/1995 | Bacon et al. | |
| 5,515,484 A | 5/1996 | Sfarti et al. | |
| 5,585,821 A | 12/1996 | Ishikura et al. | |
| 5,675,755 A | 10/1997 | Trueblood | |
| 5,694,532 A | 12/1997 | Carey et al. | |
| 5,695,346 A | 12/1997 | Sekiguchi et al. | |
| 5,745,197 A | 4/1998 | Leung et al. | |
| 5,764,317 A * | 6/1998 | Sadovnik et al. | 349/5 |
| 5,805,163 A | 9/1998 | Bagnas | |
| 5,825,436 A | 10/1998 | Knight | |
| 5,924,870 A | 7/1999 | Brosh et al. | |
| 5,982,417 A * | 11/1999 | Blonde | 348/58 |
| 5,990,990 A * | 11/1999 | Crabtree | 349/74 |
| 6,005,654 A | 12/1999 | Kipfer et al. | |
| 6,054,969 A * | 4/2000 | Haisma | 345/7 |
| 6,215,490 B1 | 4/2001 | Kaply | |
| 6,215,538 B1 | 4/2001 | Narutaki et al. | |
| 6,262,694 B1 * | 7/2001 | Ishimoto et al. | 345/1.1 |
| 6,341,439 B1 | 1/2002 | Lennerstad | |
| 6,356,281 B1 | 3/2002 | Isenman | |
| 6,369,830 B1 | 4/2002 | Brunner et al. | |
| 6,388,648 B1 | 5/2002 | Clifton et al. | |
| 6,414,728 B1 * | 7/2002 | Faris et al. | 349/10 |
| 6,438,515 B1 | 8/2002 | Crawford et al. | |
| 6,443,579 B1 | 9/2002 | Myers | |
| 6,525,699 B1 * | 2/2003 | Suyama et al. | 345/6 |
| 6,538,660 B1 | 3/2003 | Celi, Jr. et al. | |
| 6,587,118 B1 | 7/2003 | Yoneda | |
| 6,593,904 B1 | 7/2003 | Marz et al. | |
| 6,609,799 B1 | 8/2003 | Myers | |
| 6,661,425 B1 | 12/2003 | Hiroaki | |
| 6,697,135 B1 | 2/2004 | Baek et al. | |
| 6,720,961 B2 * | 4/2004 | Tracy | 345/419 |
| 6,845,578 B1 | 1/2005 | Lucas | |
| 6,906,762 B1 * | 6/2005 | Witehira et al. | 349/73 |
| 6,940,507 B2 | 9/2005 | Repin et al. | |
| 6,958,748 B1 | 10/2005 | Fukui et al. | |
| 7,113,188 B2 * | 9/2006 | Kuroda et al. | 345/426 |
| 2002/0001055 A1 | 1/2002 | Kimura et al. | |
| 2002/0093516 A1 | 7/2002 | Brunner et al. | |
| 2002/0105516 A1 | 8/2002 | Tracy | |
| 2002/0126396 A1 | 9/2002 | Dolgoff | |
| 2002/0163728 A1 | 11/2002 | Myers | |
| 2002/0163729 A1 | 11/2002 | Myers | |
| 2003/0090455 A1 | 5/2003 | Daly | |
| 2003/0132895 A1 | 7/2003 | Berstis | |
| 2003/0184665 A1 | 10/2003 | Berstis | |
| 2004/0239582 A1 | 12/2004 | Seymour | |
| 2006/0227249 A1 | 10/2006 | Chen et al. | |

FOREIGN PATENT DOCUMENTS

| | | |
|---|---|---|
| AU | 25542/99 | 9/1999 |
| AU | 24806/00 | 7/2000 |
| AU | 24538/00 | 8/2000 |
| AU | 68219/01 | 12/2001 |
| CA | 2009960 | 9/1990 |
| CA | 2075807 | 8/1991 |
| CA | 2320694 | 8/1999 |
| CA | 2329702 | 9/1999 |
| CN | 1201157 | 12/1998 |
| DE | 2730785 | 1/1979 |
| DE | 29912074 | 11/1999 |
| DE | 19920789 | 5/2000 |
| EP | 0389123 | 9/1990 |
| EP | 454423 | 10/1991 |
| EP | 0 460 314 B1 | 12/1991 |
| EP | 595387 | 5/1994 |
| EP | 0605945 | 7/1994 |
| EP | 0703563 | 3/1996 |
| EP | 0732669 | 9/1996 |
| EP | 0802684 | 10/1997 |
| EP | 872759 | 10/1998 |
| EP | 1057070 | 8/1999 |
| EP | 1058862 | 9/1999 |
| EP | 0999088 | 5/2000 |
| EP | 1151430 | 8/2000 |
| EP | 1177527 | 11/2000 |
| EP | 1 093 008 A1 | 4/2001 |
| EP | 1287401 | 3/2003 |
| GB | 2312584 | 10/1997 |
| GB | 2347003 | 8/2000 |
| GB | 2372618 | 8/2002 |
| IL | 93472 | 11/1994 |
| JP | 3021902 | 1/1991 |
| JP | 3174580 | 7/1991 |
| JP | 3226095 | 10/1991 |
| JP | 4191755 | 7/1992 |
| JP | 8036375 | 2/1996 |
| JP | 8095741 | 4/1996 |
| JP | 09-033858 | 2/1997 |
| JP | 9282357 | 10/1997 |
| JP | 9308769 | 12/1997 |
| JP | 10003355 | 1/1998 |
| JP | 10039821 | 2/1998 |
| JP | 10105829 | 4/1998 |
| JP | 10228347 | 8/1998 |
| JP | 10-301508 | 11/1998 |
| JP | 11205822 | 7/1999 |
| JP | 11272846 | 10/1999 |
| JP | 2000-142173 | 5/2000 |
| JP | 2000-347645 | 12/2000 |
| JP | 2001-215332 | 4/2002 |
| JP | 2002-271819 | 9/2002 |
| JP | 2002-350772 | 12/2002 |
| JP | 2002-099223 | 10/2003 |
| NO | 20005178 | 4/2001 |
| NZ | 505801 | 8/2002 |
| NZ | 505800 | 9/2002 |
| WO | WO 88/05389 | 7/1988 |
| WO | 91/12554 | 8/1991 |
| WO | 98/47106 | 10/1998 |
| WO | 99/42889 | 8/1999 |
| WO | 99/44095 | 9/1999 |
| WO | 00/48167 | 8/2000 |
| WO | 00/68887 | 11/2000 |
| WO | 01/01290 | 1/2001 |
| WO | 01/15128 | 3/2001 |
| WO | 0157799 | 8/2001 |
| WO | 01/95019 | 12/2001 |
| WO | WO 02/084637 | 10/2002 |
| WO | 02/091033 | 11/2002 |
| WO | 03/003109 | 1/2003 |
| ZA | 9703025 | 11/1997 |

OTHER PUBLICATIONS

Harrison et al., "Transparent Layered User Interfaces: An Evaluation of a Display Design to Enhance Focused and Divided Attention" ACM, 13 pages, 1995.

Ishii et al., "Iterative Design of Seamless Collaboration Media", Communications of the ACM, Aug. 1994, vol. 37, pp. 83-97.

Office Action U.S. Appl. No. 10/489,101, filed Mar. 29, 2006.

Office Action U.S. Appl. No. 10/489,101, filed Jul. 16, 2007.
Office Action U.S. Appl. No. 10/489,101, filed Jul. 28, 2005.
Office Action U.S. Appl. No. 10/489,101, filed Nov. 22, 2005.
Office Action U.S. Appl. No. 10/519,285, filed Sep. 10, 2007.
Office Action U.S. Appl. No. 10/519.285 Mail Date Feb. 2, 2009.
Office Action U.S. Appl. No. 10/519,285 Mail Date May 28, 2008.
Office Action U.S. Appl. No. 10/519,285 Mail Date Sep. 17, 2008.
Office Action U.S. Appl. No. 10/528,334 Mail Date Feb. 24, 2009.
Office Action U.S. Appl. No. 10/528,334 Mail Date Aug. 5, 2008.
Non-Final Office Action Mailed Feb. 2, 2009; U.S. Appl. No. 10/519,285.
Final Office Action Mailed Feb. 24, 2009; U.S. Appl. No. 10/528,334.
Clearboard 1991-1994; http://web.media.mit.edui~ishii/CB.html, pp. 1-4; 1994.
Teamworkstation 1989-1994; http://web.media.mit.edui~ishii/TWS.html; 1994.
Textarc: An Alternate Way To View Text; http://textarc.org, p. 1; 2002.
Textarc: NYSCA Grant and Public Installation; http://textarc.org, p. 1; 2002.
Textarc: The Print and the Artist; http://textarc.org, p. 1; 2002.
Final Office Action Dated Aug. 17, 2009; U.S. Appl. No. 10/519,285.
Non-Final Office Action Dated Sep. 01, 2009; U.S. Appl. No. 10/528,334.
Non-Final Office Action Dated Sep. 09, 2009; U.S. Appl. No. 10/557,157.
Non-Final Office Action Dated Aug. 12, 2009; U.S. Appl. No. 12/107,589.

* cited by examiner

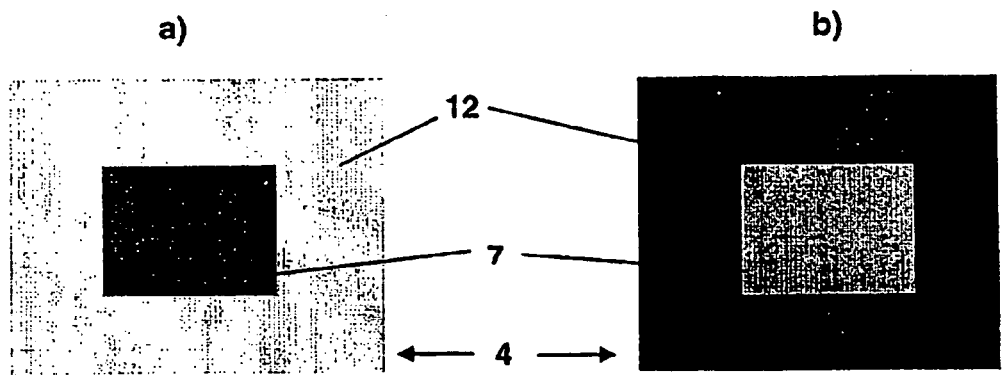
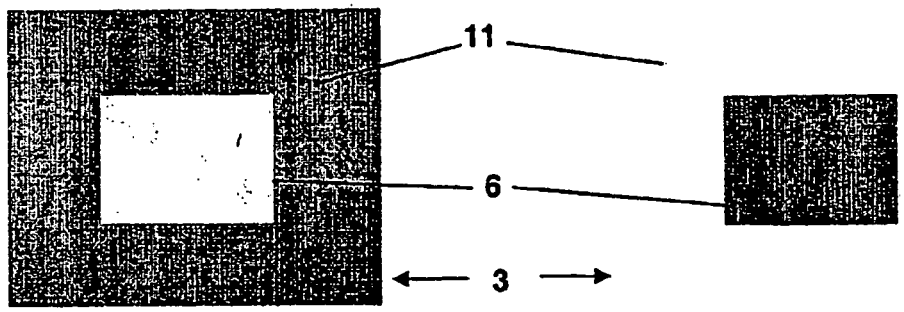
Figure 4
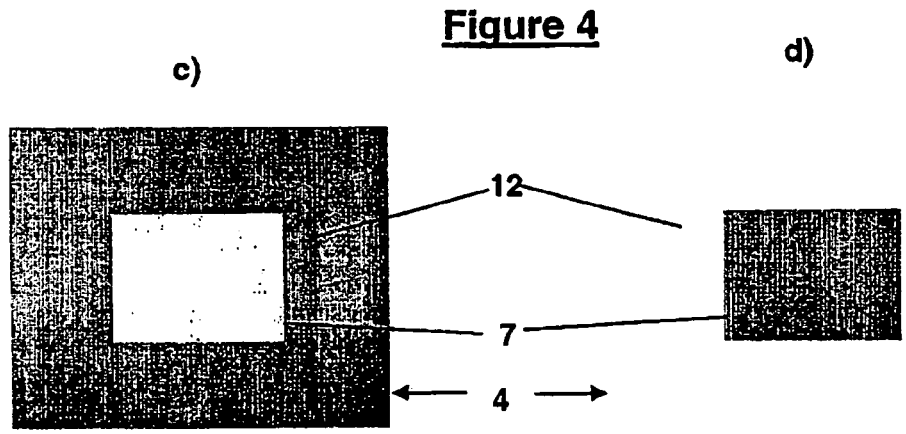
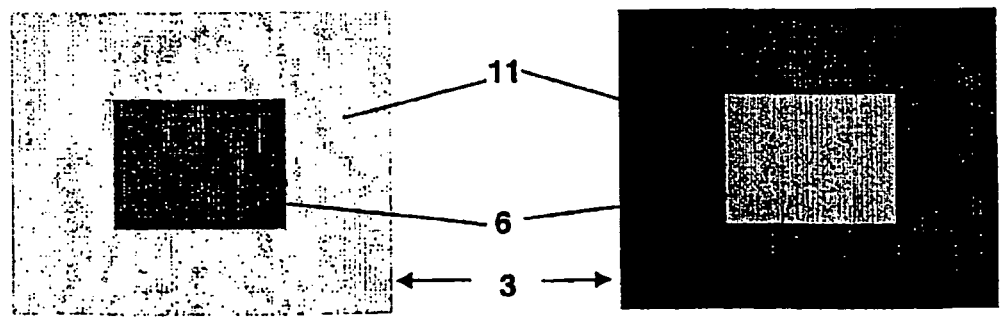

DEPTH FUSED DISPLAY

CROSS-REFERENCE TO RELATED APPLICATIONS

The present patent application is a continuation of prior PCT Patent Application No. PCT/NZ02/00243, filed on Nov. 11, 2002, which claims priority from New Zealand Patent Application No. 515395, filed on Nov. 9, 2001.

TECHNICAL FIELD

The present invention relates to a variable depth display and more particularly to use of luminance differences between images located on separate screens as the means of varying the perceived depth.

BACKGROUND ART

The ability to form images at different depths within a display, whether real or perceived, has been the subject of significant and ongoing research and development in the quest to provide display technology capable of replicating or augmenting the depth effects conferred by normal human sight.

Three-dimensional or multi-focal plane displays are known to provide numerous advantages or capabilities unavailable with conventional two-dimensional displays. The manner in which human beings process visual information has been the subject of extensive and prolonged research in an attempt to understand this complex process. This research has included the effects depth or 'apparent depth' provided by three dimensional or multi-focal pane displays.

The term preattentive processing has been coined to denote the act of the subconscious mind in analysing and processing visual information which has not become the focus of the viewer's conscious awareness.

When viewing a large number of visual elements, certain variations or properties in the visual characteristics of elements can lead to rapid detection by preattentive processing. This is significantly faster than requiring a user to individually scan each element, scrutinising for the presence of the said properties. Exactly what properties lend themselves to preattentive processing has in itself been the subject of substantial research. Colour, shape, three-dimensional visual clues, orientation, movement and depth have all been investigated to discern the germane visual features that trigger effective preattentive processing.

Researchers such as Triesman [1985] conducted experiments using target and boundary detection in an attempt to classify preattentive features. Preattentive target detection was tested by determining whether a target element was present or absent within a field of background distractor elements. Boundary detection involves attempting to detect the boundary formed by a group of target elements with a unique visual feature set within distractors. It maybe readily visualised for example that a red circle would be immediately discernible set amongst a number of blue circles. Equally, a circle would be readily detectable if set amongst a number of square shaped distractors. In order to test for preattentiveness, the number of distractors as seen is varied and if the search time required to identify the targets remains constant, irrespective of the number of distractors, the search is said to be preattentive. Similar search time limitations are used to classify boundary detection searches as preattentive.

A widespread threshold time used to classify preattentiveness is 200-250 msec as this only allows the user opportunity for a single 'look' at a scene. This timeframe is insufficient for a human to consciously decide to look at a different portion of the scene. Search tasks such as those stated above maybe accomplished in less than 200 msec, thus suggesting that the information in the display is being processed in parallel unattendedly or pre-attentively.

However, if the target is composed of a conjunction of unique features, i.e. a conjoin search, then research shows that these may not be detected preattentively. Using the above examples, if a target is comprised for example, of a red circle set within distractors including blue circles and red squares, it is not possible to detect the red circle preattentively as all the distractors include one of the two unique features of the target.

Whilst the above example is based on a relatively simple visual scene, Enns and Rensink [1990] identified that targets given the appearance of being three dimensional objects can also be detected preattentively. Thus, for example a target represented by a perspective view of a cube shaded to indicate illumination from above would be preattentively detectable amongst a plurality of distractor cubes shaded to imply illumination from a different direction. This illustrates an important principle in that the relatively complex, high-level concept of perceived three dimensionality may be processed preattentively by the sub-conscious mind.

In comparison, if the constituent elements of the above described cubes are re-orientated to remove the apparent three dimensionality, subjects cannot preattentively detect targets which have been inverted for example. Additional experimentation by Brown et al [1992] confirm that it is the three dimensional orientation characteristic which is preattentively detected. Nakaymyama and Silverman [1986] showed that motion and depth were preattentive characteristics and that furthermore, stereoscopic depth could be used to overcome the effects of conjoin. This reinforced the work done by Enns Rensink in suggesting that high-level information is conceptually being processed by the low-level visual system of the user. To test the effects of depth, subjects were tasked with detecting targets of different binocular disparity relative to the distractors. Results showed a constant response time irrespective of the increase in distractor numbers.

These experiments were followed by conjoin tasks whereby blue distractors were placed on a front plane whilst red distractors were located on a rear plane and the target was either red on the front plane or blue on the rear plane for stereo colour (SC) conjoin tests, whilst stereo and motion (SM) trials utilised distractors on the front plane moving up or on the back plane moving down with a target on either the front plane moving down or on the back plane moving up.

Results showed the response time for SC and SM trials were constant and below the 250 msec threshold regardless of the number of distractors. The trials involved conjoin as the target did not possess a feature unique to all the distractors. However, it appeared the observers were able to search each plane preattentively in turn without interference from distractors in another plane.

This research was further reinforced by Melton and Scharff [1998] in a series of experiments in which a search task consisting of locating an intermediate-sized target amongst large and small distractors tested the serial nature of the search whereby the target was embedded in the same plane as the distractors and the preattentive nature of the search whereby the target was placed in a separate depth plane to the distractors.

The relative influence of the total number of distractors present (regardless of their depth) verses the number of distractors present solely in the depth plane of the target was also investigated. The results showed a number of interesting features including the significant modification of the response time resulting from the target presence or absence. In the target absence trials, the reaction times of all the subjects displayed a direct correspondence to the number of distractors whilst the target present trials did not display any such dependency. Furthermore, it was found that the reaction times in instances where distractors were spread across multiple depths were faster than for distractors located in a single depth plane.

Consequently, the use of a plurality of depth/focal planes as a means of displaying information can enhance preattentive processing with enhanced reaction/assimilation times.

Known three-dimensional displays seek to provide binocular depth cues to the viewer via a variety of techniques including separate head-mounted displays located directly in front of each eye, lenticular displays and holography. Unfortunately, each of these possesses certain limitations. Head-mounted displays add ergonomic inconvenience, reduce the viewer's peripheral awareness and are often cumbersome and can cause nausea, headaches and/or disorientation. Lenticular displays are only really effective at oblique viewing angles and holography is currently limited to displaying static images.

A further implementation of a three-dimensional display is referred to herein as a 'combination display' is configured with two displays of known type located at differing distances from a half-silvered mirror. The orientation of the displays is such that one display is visible along a ray axis passing directly through the half-silvered mirror, whilst the other display is visible along a ray axis reflected from the mirror's surface.

A composite image may be formed therefore from the respective images shown on both displays. The differing distances of the displays from the half-silvered mirror leads to the perception that the images are located at different depths within the composite image scene viewed. Such systems are unavoidably bulky and cumbersome in comparison to conventional single screen displays in order to house the two separate displays without any physical overlap.

Furthermore, the luminance of the image transmitted to the viewer is attenuated by the intrinsic transmissive qualities of the half silvered mirror, requiring the use of a more intense back-light (or similar illumination means) in each display.

Additional difficulties arise from the generation of a parallax error proportional to the distance between the image planes, which is exacerbated by increasing the display separation to increase the 'depth' of the scene perceived by the viewer. Conversely, if the displays are brought into close proximity, moiré interference effects mar the resultant image.

Displays such as those described above create a three dimensional effect by displaying images on a number of optically overlapping, essentially planar image or boundary planes. Whilst this offers an enhancement to the depth cues afforded by a conventional display, it would be desirable to display an image at any desired depth within the display, rather than being restricted to the physical display image planes.

This problem has been partially addressed by applying a technique commonly referred to as 'depth fusion' to the above described 'combination display' i.e., a configuration of two separate displays and half-silvered mirror. Depth fusion involves displaying two identical images on separate overlapping image planes such that the alignment and magnification of the two-layer image are perceived as coterminous when viewed along the viewer's fixation axis, i.e., a line from the viewed image extending equidistantly to the fovea of each retina to the mid-point between the viewer's eyes. In a combination display, the overlapping coterminous images are discerned through the half-silvered mirror.

Contrary to an intuitive analysis, it has been found that varying the relative luminance distributions between the two overlapped images causes the perceived location of the resultant image to be at a point between the two image planes.

Whilst this clearly provides a beneficial effect, the above-described shortcomings of combination displays using a half-silvered mirror, i.e., parallax distortion, excessive bulk and luminance attenuation are still present.

Consequently, there is a need to provide the ability to display images at a variable depth without the physical constraints imposed by the above described prior art.

All references, including any patents or patent applications, cited in this specification are hereby incorporated by reference. No admission is made that any reference constitutes prior art. The discussion of the reference states what their authors assert, and the applicants reserve the right to challenge the accuracy and pertinency of the cited documents. It will be clearly understood that, although a number of prior art publications are referred to herein, this reference does not constitute an admission that any of these documents forms parts of the common general knowledge in the art in any country.

It is an object of the present invention to address the foregoing problems.

Further aspects and advantages of the present invention will become apparent from the ensuing description which is given by way of example only.

DISCLOSURE OF INVENTION

According to one aspect of the present invention there is provided a method of displaying an image of variable perceived depth using a display including:

one or more at least partially transparent, substantially parallel imaging screens located in front of, and overlapping with, a rear imaging screen, characterised in that a physical image is formed on two or more imaging screens, each image being of substantially identical configuration and being sized and aligned such that like portions of each image are coterminous to a viewer observing the display, wherein at least two of said coterminous images are displayed with different luminance.

According to a further aspect of the present invention, there is provided a display capable of operating in accordance with the above-described method.

As used herein, an image includes any definable portion of the screen ranging in size from the smallest discrete addressable element (e.g. a pixel) to an image substantially filling the imaging screen area.

Varying the luminance of the displayed images according to the present invention enables images to be displayed which are perceived by the viewer as being located at some point intermediate, or in front or behind the imaging screens.

As the imaging planes of the screens may be formed in relatively close proximity to each other, a far more compact display may be produced than is possible with conventional twin displays combined with a half-silvered mirror. This is primarily due to utilisation a common optical axis for a viewer observing all the image planes in contrast to distinct optical paths taken by light incident on the half-silvered mirror from each display in combination displays.

Preferably, the alignment and magnification of the two-layer image are perceived as coterminous when viewed along an observer's fixation axis, i.e., a line from the viewed image extending equidistantly to the fovea of each retina to the mid-point between the viewer's eyes.

Preferably the relative luminance of the imaging screen area adjacent the said images between at least two separate image planes may be varied.

Preferably, the imaging screen areas adjacent the said images on at least two separate image planes are displayed with different luminance.

Preferably, the image and imaging screen area adjacent the said image are displayed with different luminance.

It has been found that varying the luminance of an image displayed on both image planes of a dual-layer display (for example) in the above described manner will enable an observer to perceive an apparent image located between the two display screens.

It has been further realised that the perceived image generated may be caused to protrude outside the front or rear of the display. This is achieved when the two images are displayed with opposite signs of luminance difference between the image and its surroundings.

There are four possible combinations and permutations of luminance variation between an image and the adjacent area of the imaging screen on two separate screens of a multi-layer display.

Nevertheless, each variation has the common property that the front and rear displays have opposite signs of luminance between the image and its surroundings:—a front image luminance brighter than its surroundings would have a rear image with a darker luminance to the surrounding area of the rear screen and vice-versa.

Preferably, the said images appear coterminous to an observer viewing along a along a sight-line extending from a mid point between the observers eyes to the images.

A potential disadvantage of displays comprised of mechanically stacked image planes as described above is that a proportion of the illuminating light, whether emitted from the rear screen or incident light reflected one or more of the display screens, is absorbed during successive transmissions through the transparent screen layers. As the display layers located in front of the emissive or reflective rear screen are transparent with passive display images or elements (i.e. non-light generating), it is not possible to obtain a brighter image, or image surroundings on a front screen than on a rear screen without the introduction of some form of additional illumination between screen layers.

Combined displays using a half-silvered mirror configuration as previously described circumvent this difficulty as neither display is transparent in itself and may therefore be formed with an emissive backlight source whose luminance may be individually varied as required.

However, this disadvantage may be overcome according to a further aspect of the present invention by the inclusion of an at least partially transparent emissive layer between said image planes. In one embodiment, said emissive layer is a light guide.

According to one aspect of the present invention, said emissive layer is a sheet with substantially planar opposed upper and a lower surfaces and a peripheral boundary of a prescribed thickness, said sheet formed from a material such that light rays incident from said peripheral boundary are retained between the said planar surface through total internal refraction at angles less than a critical angle.

Preferably, at least one said sheet planar surface has a plurality of defined features located thereupon capable of refracting a said retained light ray incident on a said feature through an angle greater than the said critical angle of total internal reflection sufficient to exit said sheet via one of said planar surfaces.

In order to be capable of displaying the four permutations of luminance variation possible between an image and its adjacent screen area displayed on two overlapping screens, it follows that the front-most screen must be capable of independently displaying images with greater luminance than the rearward screen.

Thus, for embodiments utilizing a light guide as the emissive layer, the said features are only applied to the surface facing the front screen.

Preferably, said features include diffusion dots, predetermined scratches, indentations protrusion, regular or irregular undulations and the like.

Preferably, at least one light source is located along said peripheral boundary.

According to one aspect of the present invention, said light source is a cold cathode fluorescent tube. In an alternative embodiment, the light source may be light emitting diodes (LEDs).

The use of a light guide as the transparent emissive layer differs from known utilisations of such materials, which have hitherto been utilised solely for illumination purposes, though without using its transparent properties as part of the optical pathway of a display.

Preferably, said emissive layer is configured to refract the ray axis of light at the said peripheral boundary such that the peripheral boundary between adjacent screens is not visible along said viewer's sightline.

According to one aspect of the present invention, the said features are distributed with increasing density as a function of distance from said light source. Preferably, said function is quadratic.

According to an alternative embodiment of the present invention, the said prescribed thickness of the emissive sheet is reduced as a function of distance from a said light source.

According to an alternative embodiment of the present invention, said emissive layer is formed from a transparent organic light emitting diode (TOLED) assembly.

The use of light guides and TOLED assemblies in multi-layer displays are described in the applicants co-pending New Zealand Patent Application No. 514500 incorporated by reference herein.

A further advantage of the present invention relates to the existing problem of parallax error created by viewing the composite image from an off-fixation axis angle. Existing combination displays suffer from pronounced parallax effects for off-axis viewing due to the degree of physical separation between the two displays.

Any means of increasing the acceptable viewing angle of a display greatly enhances the display's usability. Whilst viewing a display, particularly computer monitors and the like, from large off axis angles is unusual, it is entirely normal for a viewer to move their viewpoint to a limited degree.

Parallax error reduces the effects of 'depth fusion' as this implicitly requires the images on different screens to be substantially aligned. The effects of parallax are reduced by the present invention by two features.

Firstly, reducing the physical separation between displays by physically stacking in an overlapping alignment produces a significant reduction in parallax in comparison to that of 'combination displays' as described above.

Secondly, in a further embodiment, parallax effects are attenuated by interposing a refractor between the said imaging screens.

Preferably, said refractor has a greater refractive index than air. It is possible, the display may be operated in a medium other than air, in which case, said refractor has a refractive index greater than that of said medium.

Thus, according to a further aspect, the present invention further includes a refractor interposed between at least two said imaging screens, wherein said refractor is formed from a material having a greater refractive index than that of a medium immediately adjacent the display exterior.

To an observer viewing the display image from a non-orthogonal angle to the display screen, the light from the rear screen would appear to originate from a point closer to the front screen due to the refraction by the refractor.

It will be appreciated that the function of the refractor may be incorporated into the said emissive layer. The refractor may be formed integrally with an emissive layer such as a light guide or may consist of a separate refractor attached to the emissive layer.

According to one embodiment the said imaging screens are liquid crystal display (LCD) screens.

However, it will be understood that the invention is not necessarily restricted to the use of LCD screens, and that any transparent or semi-transparent displays may be used for the display screens. A non-transparent display technology may be utilised for the rear imaging screen.

Thus, by virtue of the configuration of the applicant's displays described or referred to herein, it is possible to readily add further display screens to enhance the number of image planes on which physical images may be formed. It will be appreciate that non-depth fused images may also be displayed on one or more of said screens.

The incorporation of an emissive layer, such as a light guide, between display screens further facilitates the addition of multiply overlapping display screens. The transmissive losses associated with light passing through each additional display may be countered by the added illumination provided by the emissive layers.

The present invention may be utilised in any application where the ability to vary the perceived depth, or degree of projection of an image is beneficial such as providing contouring effects for maps. It has also been found the effects of depth fusion are particularly effective with images of ill-defined borders such as clouds, smoke and so forth.

The principle by which the human brain perceives an image in front of, between, or behind the various image planes of a multi-screen display is believed to relate to the mental processing of the two-slightly different retinal images observed by the viewer's eyes. It is useful to utilise the mathematics of Fourier analysis/transforms and the like as a means of comprehending the human preceptions and to quantify the effect.

As is well known in the art, Fourier synthesis provide a means of composing any repetitive waveform from the weighted sum of appropriate sine waves of appropriate amplitude and phases.

The inverse of this process;—Fourier analysis, is the process of braking a waveform into its constituent sine waveformns. In two-dimensional display optics, these forms are variations in the luminance and chrominance channels as a function of space. However, it is believed that when comparing the binocular disparities to form depth perception, the human brain only processes the longer wavelengths.

Thus, if a first two-dimensional image is displayed to overlap a second spacially separated coterminous second image with a different luminance, or different background luminance, this limitation of human cerebral processing causes a change in the binocular disparity perceived with the resultant image being formed at a point intermediate the image planes.

BRIEF DESCRIPTION OF DRAWINGS

Further aspects of the present invention will become apparent from the following description which is given by way of example only and with reference to the accompanying drawings in which:

FIG. 4(*a-d*) shows the luminance distribution of a two layer display in accordance with a further embodiment of the present invention;

BEST MODES FOR CARRYING OUT THE INVENTION

Figure 1:
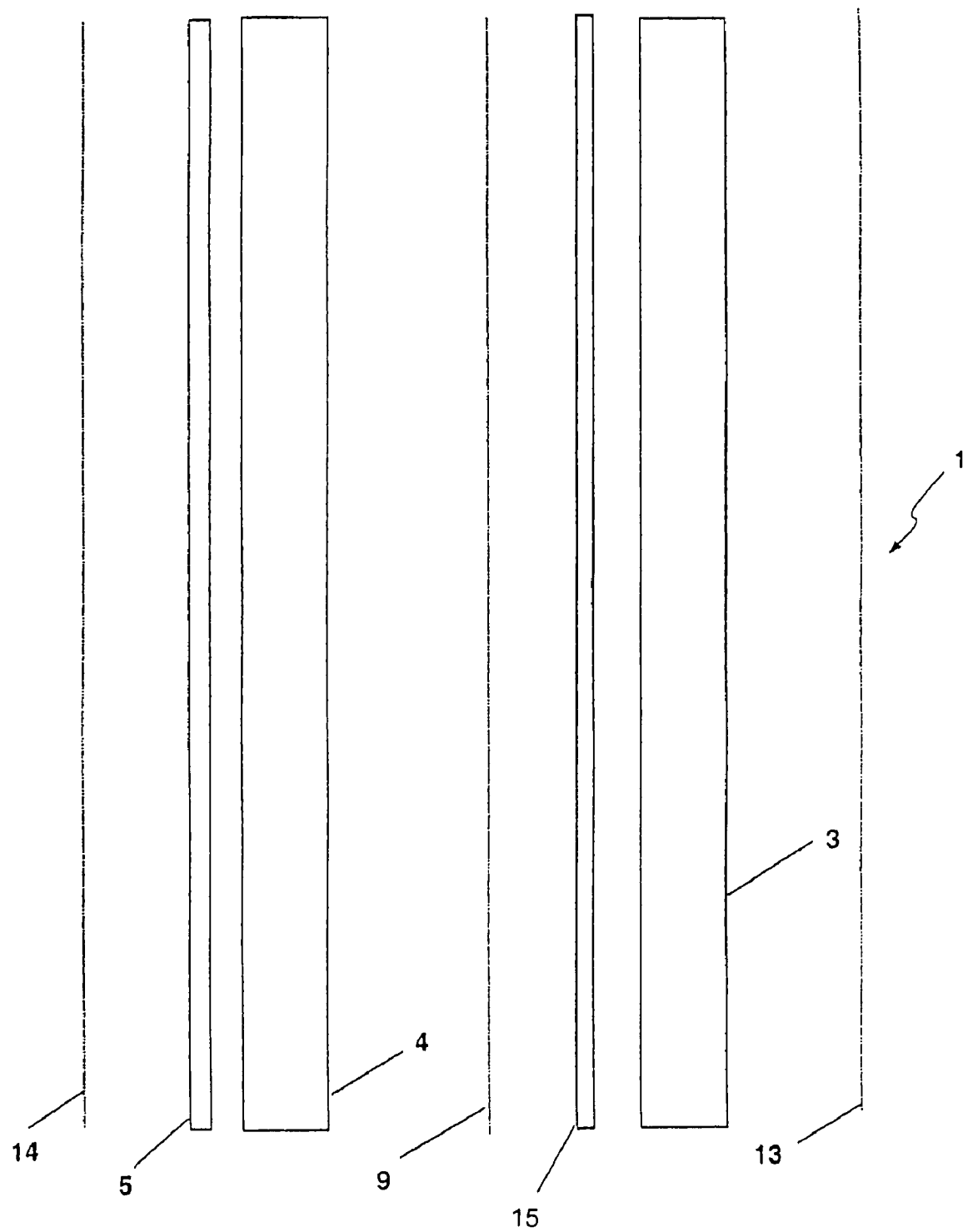
FIG. 1 shows schematic exploded cross sectional view of a display in accordance with a preferred embodiment of the present invention.

The FIGS. 1-4 illustrate preferred embodiments of the present invention in which a display (1) capable of displaying a variable depth image (2) is composed of a plurality of transparent imaging screens in the form of LCD screens (3), parallel to, but spaced apart from each other and to a rear display screen (4) provided with a backlight (5). It should be apparent to one skilled in the art that a number of alternative display technologies may be utilised in place of the LCD screens. Furthermore, although FIG. 1 shows a single screen (3) in front of the rear display (4) for the sake of clarity and convenience, any number of additional (at least partially transparent) imaging screens (3) may be incorporated. Such displays provide a three dimensional quality the scene viewed by an observer, as described in the applicants co-pending patents PCT No. PCT/NZ98/00098 and PCT/NZ99/00021, incorporated by reference herein.

Although, as previously stated, the present invention is not specifically restricted to the use of Liquid Crystal Display screens, nevertheless, this type of display technology does posses many beneficial attributes to lend itself to use in the applicant's displays. By way of a brief overview of LCDs, there are two main types of Liquid Crystal Displays used in computer monitors, passive matrix and active matrix. Passive-matrix Liquid Crystal Displays use a simple grid to supply electrical charge to a particular pixel on the display. The grids made from a transparent conductive material (usually indium tin oxide), are formed using two glass layers called substrates, one provided with columns, the other with rows.

The rows or columns are connected to integrated circuits that control when a charge is applied to a particular column or row. The liquid crystal material is sandwiched between the two glass substrates, and a polarizing film is added to the outer side of each substrate.

A pixel is defined as the smallest resolvable area of an image, either on a screen or stored in memory. Each pixel in a monochrome image has its own brightness, from 0 for black to the maximum value (e.g. 255 for an eight-bit pixel) for white. In a colour image, each pixel has its own brightness and colour, usually represented as a combination of red, green and blue intensities.

To activate a particular pixel, the integrated circuit applies a charge to the relevant column of one substrate whilst grounding the corresponding row on the other substrate. The voltage applied to the intersection of the relevant row and column designating the pixel untwists the liquid crystals at that pixel.

However, the passive matrix system has significant drawbacks, notably slow response time and imprecise voltage control. Response time refers to the Liquid Crystal Displays ability to refresh the image displayed. Imprecise voltage control hinders the passive matrix's ability to influence a single pixel at a time. When voltage is applied to untwist one pixel, the pixels around it also partially untwist, which makes images appear fuzzy and lacking in contrast.

Active-matrix Liquid Crystal Displays depend on thin film transistors (TFT). Thin film transistors are tiny switching transistors and capacitors arranged in a matrix on a glass substrate. To address a particular pixel, the appropriate row is switched on, and then a charge is sent down the correct column. Since all of the other rows that the column intersects are turned off, only the capacitor at the designated pixel receives a charge. The capacitor is able to hold the charge until the next refresh cycle. Furthermore, if the amount of voltage supplied to the crystal is carefully controlled, it can be made to untwist only enough to allow some light through. By doing this in very exact, very small increments, Liquid Crystal Displays can create a grey scale. Most displays today offer 256 levels of brightness per pixel.

A Liquid Crystal Display that can show colours must have three subpixels with red, green and blue colour filters to create each colour pixel. Through the careful control and variation of the voltage applied, the intensity of each subpixel can range over 256 shades. Combining the subpixels produces a possible palette of 16.8 million colours (256 shades of red×256 shades of green×256 shades of blue).

Liquid Crystal Displays employ several variations of liquid crystal technology, including super twisted nematics, dual scan twisted nematics, ferroelectric liquid crystal and surface stabilized ferroelectric liquid crystal. There are also emissive technologies such as Organic Light Emitting Diodes which are addressed in the same manner as Liquid Crystal Displays.

However, there are a number of practical considerations need to be addressed to produce a functional displays utilising multiple overlapping LCD screens, including the reduction or elimination of moiré interference effects, coloured fringes, and crossed-polarisers, which are addressed in a number of ways including the use of diffusers, optical retarders and other optical materials and/or material finishes.

To aid understanding and for the sake of clarity, the display (1) and associated display screens (3, 4) are shown in simplified, schematic form in the drawings.

Although the rear screen (4) may also be an LCD screen, it will be apparent that alternative, non-transparent display technology may be employed.

Figure 2:
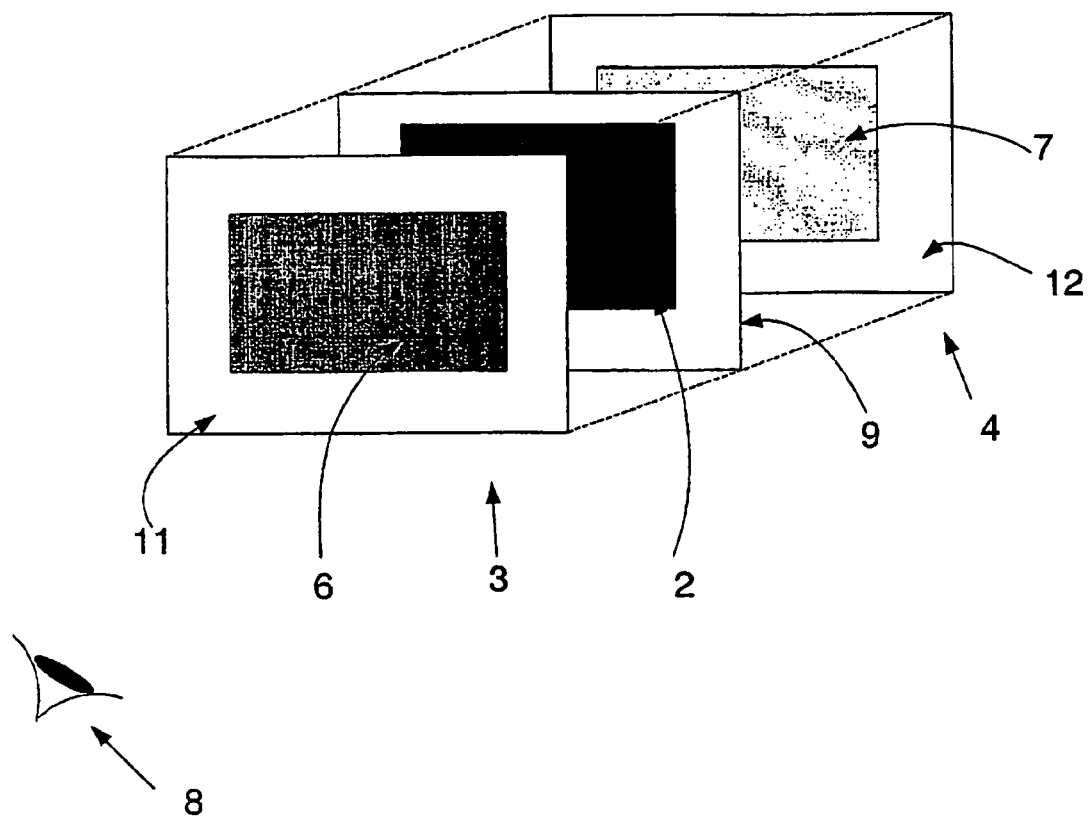
FIG. 2 shows a perspective view of the embodiment shown in FIG. 1.

FIG. 2 shows a perspective view of a simplified dual screen display (1), whereby physical image (6, 7) is displayed on the front and rear screen (3, 4) respectively.

The images (6, 7) are substantially identical in configuration and are aligned and dimensioned on their respective screens (6, 7) such that the two images appear to overlap exactly (i.e., they are coterminous) to an observer (8) viewing the display (1).

By altering the luminance distribution between the two images (6, 7) the resultant image (2) perceived by an observer (8) appears to be located on an illusory plane (9) between the image planes of the two screens (6, 7).

It will be apparent that this precise overlapping condition between the two images (6, 7) only occurs along a particular optical axis. This axis is known as the fixation axis (10) and extends (equidistantly to the retinal foveas) from the image (6, 7) being observed to the mid point between the observers (8) eyes.

Figure 3:
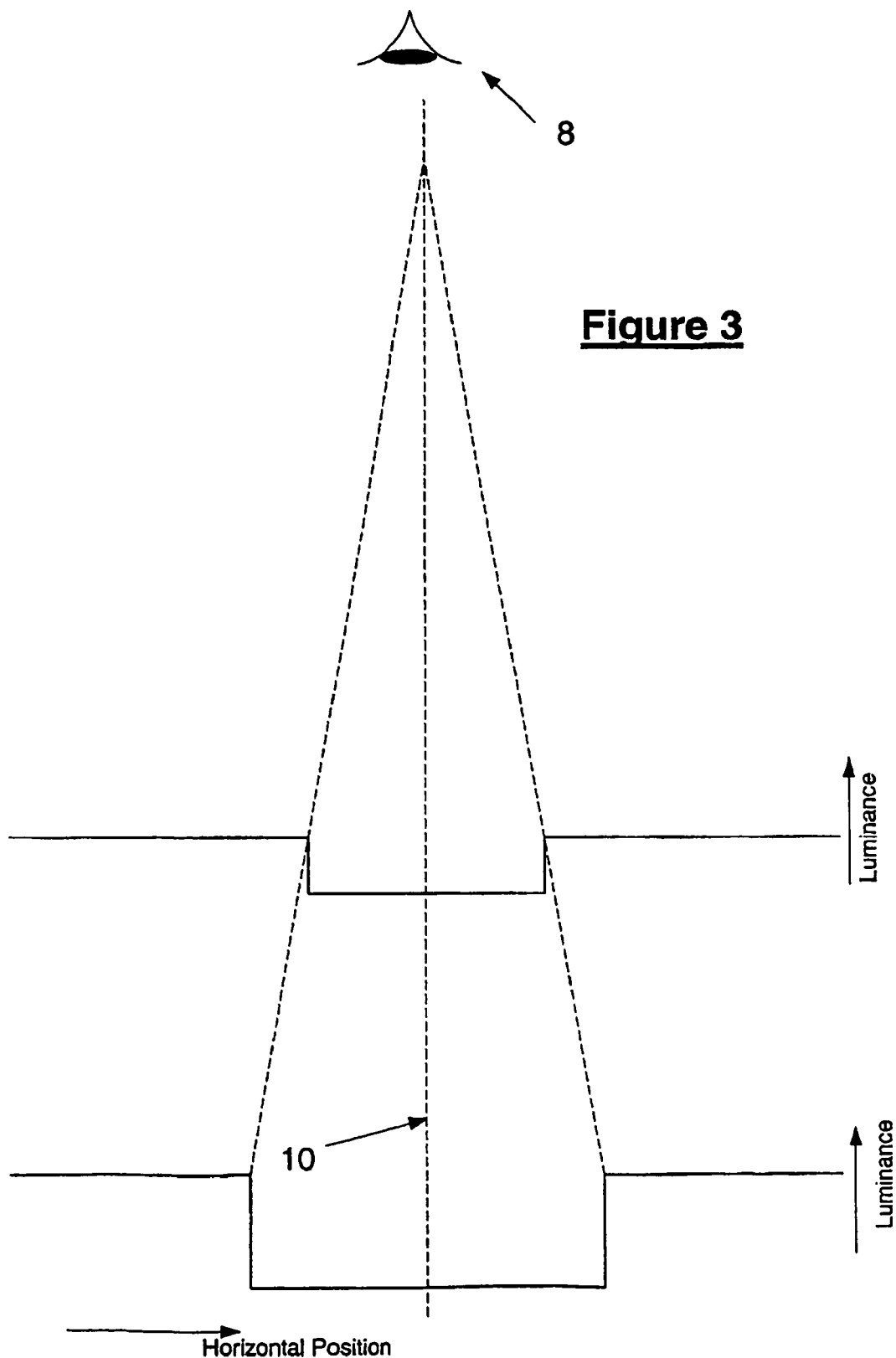
FIG. 3 shows the luminance distribution of a two layer display in accordance with a preferred embodiment of the present invention.

FIG. 3 shows the variation in luminance distribution for images (6, 7) displayed at the two screens (3, 4). It will be appreciated that in addition to varying the relative luminance between the two images (6, 7) the luminance of the display screen area (11, 12) adjacent to the images (6, 7) may also be varied.

FIG. 4 shows four combinations of luminance variation between the images (6, 7) and surrounding screen areas (11, 12) respectively such that the front and rear images have an opposite sign of luminance difference between the images (6, 7) and the surroundings (11, 12). To aid visualisation of the differing luminance levels, the two screens (3, 4) are illustrated in the same plane;—in practice, the screens (3, 4) would overlap.

FIG. 4(a) and 4(b) show luminance levels whereby the resultant perceived image (2) is positioned in front of the display (1) in an front illusory plane (13) (as shown in FIG. 1) whilst FIGS. 4(c) and 4(d) illustrate the situation where the perceived image (2) is positioned behind the rear screen (4) in a rear illusory plane (14).

Figure 5:
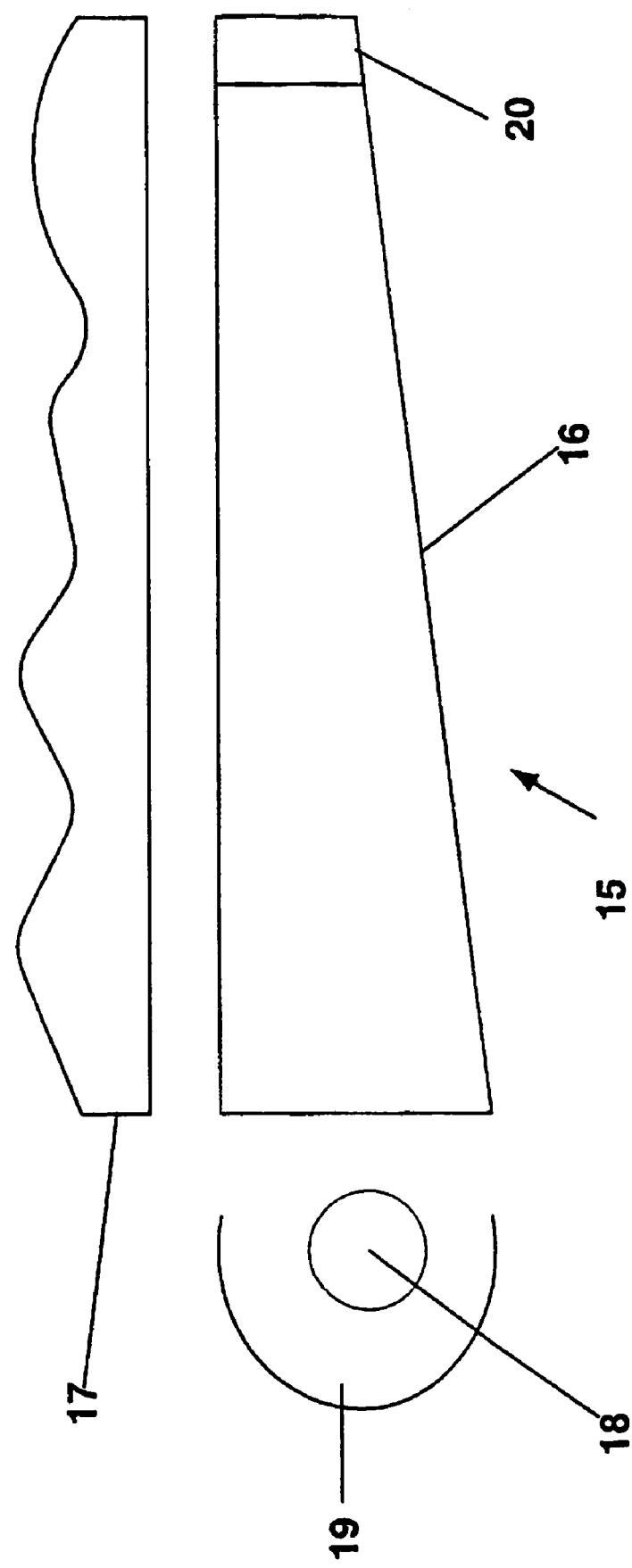
FIG. 5 shows an enlarged representative of a portion of the display shown in FIG. 1.

As previously indicated, an emissive source is required between the two screens (3, 4) if the front image (6) or surrounding screen area (11) is to have a higher luminance than the corresponding portions of the rear screen (4). The schematic representation of a display (1) illustrated in FIG. 1 show the addition of an emissive layer in the form of a light guide (15) located between the screens (3, 4). FIG. 5 shows an expanded view of the light guide (15) in the form of a rectangular clear acrylic sheet (16) with a substantially planar upper and lower surface with a diffuser (17) affixed thereto or located adjacent to respectively. The light guide has along one peripheral boundary a cold cathode florescent tube (18) housed within a parabolic reflector (19) which reflects the illumination through the peripheral boundary wall of the light pipe (15), it there being retained by virtue of total internal reflection. Either or both of the planar surfaces of the light guide (15) may be provided with a plurality of diffusion dots.

The diffusion dots are localised regions whereby the light constrained within the light guide striking the diffusion dots exceed the critical angle for total internal refraction and are emitted from the planar surface. To maintain an even distribution of luminosity, the cross sectional profile of the light guide (15) tapers with respect to distance from the florescent tube (18). The opposing peripheral boundary to the florescent tube (18) is provided with an end reflector (20).

Figure 6:
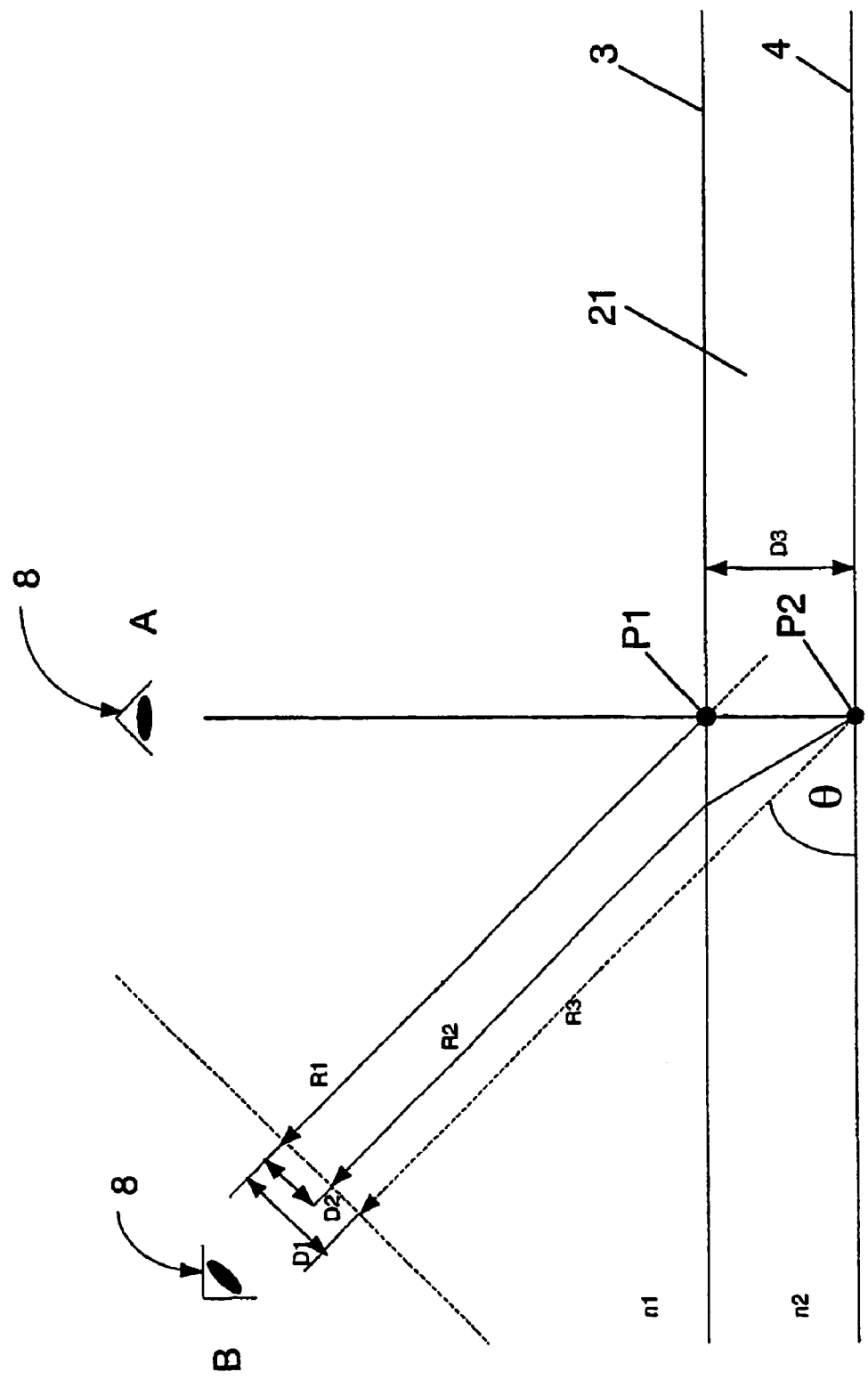
FIG. 6 shows a refractor incorporated in an embodiment of the present invention shown in FIG. 1.

FIG. 6 schematically shows the incorporation of a refractor (21) between a front screen (3) and a rear screen (4) and the effects on an observer (8) viewing the display from a position (A) substantially orthogonal to the plane of the screens (3,4), and a position (B) subtending an acute angle θ with the screens (3, 4).

When the observer (8) is in position (A), i.e., the conventional viewing position, there is no parallax error between a substantially identical images (notwithstanding the difference in luminance) located on the screens (3, 4) at points P1 and P2 respectively.

In the case of air (of refractive index n1) being the medium in front of and between the screen (3, 4), an observer at position B would see points P1 and P2 as being separated by a distance D1, which varies from zero to a value equal to the separation D3 of the screens (3, 4) for values of θ varying from 90-0 respectively.

Inserting the refractor (21) between the screen (3, 4) causes an alteration of the light rays (R1 and R2) to the observer (8) from P1 and P2 respectively. The refractor (21) has a refractive index n2 (where n2>n1) and thus, the light R2 passing through the refractor (21) from the image at point P2 is refracted towards the light R1 from the image at P1. Consequently, the two images appear to be separated by a closer distance D2 than the distance D1 apparent without the refractor (21) and parallax is thus reduced.

The refractor (21) may be a distinct component in the display (1) or form part of the emissive layer such as the light guide assembly (15).

Whilst the theoretical explanation for the phenomena of depth fusion differ amongst the scientific/engineering community, the benefits of employing such techniques with multifocal plane displays utilising the applicants technology yield undeniable advantages over the prior art, particularly the use of combination displays.

Aspects of the present invention have been described by way of example only and it should be appreciated that modifications and additions may be made thereto without departing from the scope thereof.

What is claimed:

1. A method of presenting an image using a multi-component display, said method comprising:
   displaying, at a first display screen of said multi-component display, a first graphical object in accordance with a first luminance;
   increasing said first luminance using an emissive component disposed between said first display screen and a second display screen of said multi-component display;
   displaying, at said second display screen, a second graphical object in accordance with a second luminance, wherein said first display screen overlaps said second display screen; and
   wherein said displaying said first and second graphical objects further comprises displaying said first and second graphical objects in an overlapping manner to thereby present an image, wherein a perceived depth of said image is related to said first and second luminance.

2. The method of claim 1, wherein said perceived depth is located outside of a depth range spanning from said first display screen to said second display screen.

3. The method of claim 1, wherein a portion of said first display screen separate from said portion occupied by said first graphical object comprises a third luminance, wherein a portion of said second display screen separate from said portion occupied by said second graphical object comprises a fourth luminance, and wherein said perceived depth is further related to said third luminance and said fourth luminance.

4. The method of claim 3, wherein said first luminance, said second luminance, said third luminance, and said fourth luminance comprise at least two different luminance values.

5. The method of claim 3, wherein said first luminance, said second luminance, said third luminance, and said fourth luminance share at least one common luminance value.

6. The method of claim 1, wherein a luminance value of said first graphical object is different from a luminance value of said second graphical object.

7. The method of claim 1, wherein said emissive component comprises a light guide for transmitting light from at least one light source.

8. The method of claim 7, wherein said at least one light source is selected from a group consisting of a cold cathode fluorescent tube and a light emitting diode.

9. The method of claim 1, wherein said emissive component comprises at least one feature selected from a group consisting of diffusion dots, scratches, indentations, protrusions and undulations.

10. The method of claim 1 further comprising:
    refracting light emitted from said second display screen using a refractor disposed between said first and second display screens.

11. The method of claim 1 further comprising:
    refracting light emitted from said emissive component of said multi-component display using a refractor of said multi-component display.

12. The method of claim 11, wherein said emissive component comprises said refractor.

13. A method of varying a perceived depth of an image presented using a multi-component display, said method comprising:
    displaying, at a first display screen of said multi-component display, a first graphical object with a first luminance;
    increasing said first luminance using an emissive component disposed between said first display screen and a second display screen of said multi-component display;
    displaying, at said second display screen, a second graphical object with a second luminance, wherein said first display screen overlaps said second display screen;
    wherein said displaying said first and second graphical objects further comprises displaying said first and second graphical objects in an overlapping manner to thereby present an image, wherein a perceived depth of said image is related to said first and second luminance; and
    varying said perceived depth by altering at least one luminance selected from a group consisting of said first luminance and said second luminance.

14. The method of claim 13, wherein said perceived depth is located outside of a depth range spanning from said first display screen to said second display screen.

15. The method of claim 13, wherein a portion of said first display screen separate from said portion occupied by said first graphical object comprises a third luminance, and wherein a portion of said second display screen separate from said portion occupied by said second graphical object comprises a fourth luminance.

16. The method of claim 15, wherein said first luminance, said second luminance, said third luminance, and said fourth luminance comprise at least two different luminance values.

17. The method of claim 15, wherein said first luminance, said second luminance, said third luminance, and said fourth luminance share at least one common luminance value.

18. The method of claim 15 further comprising:
    further varying said perceived depth by altering at least one luminance selected from a group consisting of said third luminance and said fourth luminance.

19. The method of claim 15, wherein said emissive component comprises a light guide for transmitting light from at least one light source.

20. The method of claim 19, wherein said at least one light source is selected from a group consisting of a cold cathode fluorescent tube and a light emitting diode.

21. The method of claim 15, wherein said emissive component comprises at least one feature selected from a group consisting of diffusion dots, scratches, indentations, protrusions and undulations.

22. The method of claim 13 further comprising:
refracting light emitted from said second display screen using a refractor disposed between said first and second display screens.

23. The method of claim 13 further comprising:
refracting light emitted from said emissive component of said multi-component display using a refractor of said multi-component display.

24. The method of claim 23, wherein said emissive component comprises said refractor.

25. A multi-component display comprising:
a first display screen operable to display a first graphical object in accordance with a first luminance;
a second display screen operable to display a second graphical object in accordance with a second luminance, wherein said first display screen overlaps said second display screen;
an emissive component disposed between said first and second display screens, wherein said emissive component is operable to increase said first luminance; and
wherein said first and second display screens are further operable to display said first and second graphical objects in an overlapping manner to thereby present an image, wherein a perceived depth of said image is related to said first and second luminance.

26. The multi-component display of claim 25, wherein said perceived depth is located outside of a depth range spanning from said first display screen to said second display screen.

27. The multi-component display of claim 25, wherein a portion of said first display screen separate from said portion occupied by said first graphical object comprises a third luminance, wherein a portion of said second display screen separate from said portion occupied by said second graphical object comprises a fourth luminance, and wherein said perceived depth is related to said third luminance and said fourth luminance.

28. The multi-component display of claim 27, wherein said first luminance, said second luminance, said third luminance, and said fourth luminance comprise at least two different luminance values.

29. The multi-component display of claim 27, wherein said first luminance, said second luminance, said third luminance, and said fourth luminance share at least one common luminance value.

30. The multi-component display of claim 25, wherein said first and second display screens are operable to dynamically adjust said perceived depth of said image by altering at least one luminance selected from a group consisting of said first luminance and said second luminance.

31. The multi-component display of claim 25, wherein said emissive component comprises a light guide for transmitting light from at least one light source.

32. The multi-component display of claim 31, wherein said at least one light source is selected from a group consisting of a cold cathode fluorescent tube and a light emitting diode.

33. The multi-component display of claim 25, wherein said emissive component comprises at least one feature selected from a group consisting of diffusion dots, scratches, indentations, protrusions and undulations.

34. The multi-component display of claim 25 further comprising:
a refractor disposed between said first and second display screens, wherein said refractor is operable to refract light emitted from said second display screen.

35. The multi-component display of claim 25 further comprising:
a refractor disposed in front of said emissive component, and wherein said refractor is operable to refract light emitted from a component selected from a group consisting of said second display screen and said emissive component.

36. The multi-component display of claim 35, wherein said emissive component comprises said refractor.

37. A method of presenting a graphical object using a multi-component display, the multi-component display including a first display screen including a first plurality of pixels, the multi-component display including a second display screen including a second plurality of pixels, said method comprising:
generating, using at least a portion of the first plurality of pixels, a first portion of the graphical object;
displaying, at the first display screen, said first portion of the graphical object in accordance with a first luminance;
generating, using at least a portion of the second plurality of pixels, a second portion of the graphical object;
displaying, at the second display screen, said second portion of the graphical object in accordance with a second luminance;
wherein said first display screen overlaps said second display screen;
overlapping display of the first portion of the graphical object with the display of the second portion of the graphical object to thereby generate display of the graphical object; and
providing a luminance associated with said first display screen that is greater than a luminance associated with said second display screen, wherein said providing a luminance further comprises providing said luminance using an emissive component disposed between said first display screen and said second display screen, and wherein a perceived depth of said graphical object is related to said first and second luminance.

38. The method of claim 37 further comprising:
displaying said first portion of the graphical object using at least a portion of the first plurality of pixels of said first display screen.

39. The method of claim 38 further comprising:
displaying said second portion of the graphical object using at least a portion of the second plurality of pixels of said second display screen.

40. The method of claim 37 further comprising:
dynamically adjusting the perceived depth of said graphical object by modifying at least one luminance selected from a group consisting of: the first luminance, the second luminance, and combinations thereof.

41. The method of claim 37 further comprising:
refracting light emitted from said second display screen using a refractor disposed between said first and second display screens.

42. A multi-component display comprising:
means for displaying a first graphical object in accordance with a first luminance, wherein said means for displaying said first graphical object is further operable to display said first graphical object using at least one pixel;
means for displaying a second graphical object in accordance with a second luminance, wherein said means for displaying said second graphical object is further operable to display said second graphical object using at least one pixel, wherein said means for displaying said first graphical object overlaps said means for displaying said second graphical object;

wherein said means for displaying said first and second graphical objects are further operable to display said first and second graphical objects in an overlapping manner to thereby present an image, wherein a perceived depth of said image is related to said first and second luminance; and means for increasing said first luminance, wherein said means for increasing said first luminance is disposed between said means for displaying said first and second graphical objects.

43. The multi-component display of claim 42, wherein a portion of said means for displaying said first graphical object separate from said portion occupied by said first graphical object comprises a third luminance, wherein a portion of said means for displaying said second graphical object separate from said portion occupied by said second graphical object comprises a fourth luminance, and wherein said perceived depth is related to said third luminance and said fourth luminance.

44. The multi-component display of claim 42, wherein said means for displaying said first and second graphical objects are operable to dynamically adjust said perceived depth of said image by altering at least one luminance selected from a group consisting of said first luminance and said second luminance.

45. The multi-component display of claim 42 further comprising:

means for refracting light emitted from said means for displaying said second graphical object, wherein said means for refracting light is disposed between said means for displaying said first graphical object and said means for displaying said second graphical object.

* * * * *